Patented Nov. 18, 1947

2,430,987

UNITED STATES PATENT OFFICE 2,430,987

ADHESIVE FOR USE AS TILE CEMENTS AND THE LIKE

Gordon F. Lindner, Royal Oak, Mich., and Harvey J. Livermore, St. Paul, Minn., assignors to Minnesota Mining & Manufacturing Company, St. Paul, Minn., a corporation of Delaware No Drawing. Application December 8, 1944, Serial No. 567,310

6 Claims. (Cl. 106—241)

The present invention relates generally to adhesive or cement compositions and to products made therewith. It especially concerns compositions adaptable for use, for example, as tile cements or acoustical cements.

This application is a continuation-in-part of our pending application Serial Number 339,004, filed June 5, 1940.

Heretofore compositions known to us which have been suggested for use as tile cements have been unsatisfactory in one respect or another and have failed to provide a composition or cement having advantageous combined properties. For example, one composition might have fairly satisfactory properties in the form of the final dried film but might lack desired application characteristics and/or suitable wet strength or other properties. Another composition might have passable application characteristics but a tendency, for example in the case of lacquered tile, to soak or permeate through the back of the tile and to attack the lacquered surface thereof, thus injuring its appearance and causing what is frequently termed in the trade as "orange-peel." Other compositions may be deficient in still other important properties. A salient purpose of the present invention, insofar as it is directed to tile cements or acoustical cements or like compositions, is to provide cements of such general type which have a new, improved and advantageous combination of desired properties, as a whole.

Desired properties in adhesive or cement compositions used as tile cements or the like include suitable color, good transferability (ability to readily wet and form a bond with the surface of an object applied there-against), a long bonding time, drying characteristics such that tiles or the like will not be loosened while the cement is setting, suitable consistency or buttery character, high initial wet strength of the freshly applied cement, sufficient water resistance in the form of the final dried film to withstand the action of water and/or steam such as may occur in bath showers, for example, sufficient heat resistance in the form of the final dried film to withstand temperatures up to about 140° F., or so, while still retaining a high strength, freedom from brittleness in the dried or set state, resistance to or freedom from tendency to crystallize or harden in containers during storage, etc., as well as high permanent adhesion to a wide variety of structural materials when dried in contact therewith.

The objects of this invention comprise the production of a cement or adhesive of improved characteristics in one or more of the respects just mentioned. Additionally it is an object of the present invention to provide an adhesive composition or cement of advantageous combined properties. These and other objects and advantages will appear from the description taken as a whole.

For the sake of quickly illustrating specific embodiments of our invention, illustrative compositions or formulae will be given.

Formula I

| | Pounds |
|---|---|
| "Solros" rosin | 900 |
| "Fosfo" rosin | 300 |
| Dixie clay | 1500 |
| Mineral oil | 200 |
| Denatured ethyl alcohol | 120 |
| Petrobenzol | 175 |
| Water | 37 |

The "Solros" rosin employed, which is a well known article of commerce, was a heat treated wood rosin having a melting point of 77° C., ball and ring method, and an acid number of the order of 125. The "Fosfo" rosin employed, also a well known article of commerce, was a wood rosin which had been treated with 4½% of its weight of lime and had a melting point of 118° C., ball and ring method, and an acid number of the order of 75. The Dixie clay employed was a relatively low colloidal, but very fine, kaolin type clay of floury nature, found in large deposits in various parts of the United States, for example North Carolina. The particle size of the particular clay used was such that 98 percent thereof would pass a 300-mesh screen, which is a small particle size compared with many pigments, for example. The mineral oil employed had a Saybolt viscosity at 100° F. in the range of 500 to 530 seconds. The denatured ethyl alcohol is, of course, a well known article of commerce, the denaturants being not necessarily but merely incidentally present. The petro-benzol is a petroleum hydrocarbon fraction boiling substantially completely within the range of 140° F. to 210° F.

The above composition has been employed to advantage for a number of uses, e. g., for use in applying wall tile of various types such as asphalt tile and lacquered Masonite tile, or various ceramic, enamel, metal or other members, to the ceilings or walls of rooms. Some of the properties of the above illustrated composition and advantages thereof over cements heretofore proposed for bonding wall tile and/or equivalent elements to ceilings or walls, are as follows:

(1) *Ease of application.*—Because of its buttery character, the above composition can be removed from the container and spread on the tile or wall surface without stringing and the cement stays in place without flowing.

(2) *Long bonding range.*—Because the composition dries slowly and resists formation of a skin on the surface thereof, application of the tile to the wall can be made up to at least thirty minutes after the cement is spread. Most cements which have been suggested for this purpose "skin over" rapidly and the bonding range is usually not over 5 to 10 minutes.

(3) *Higher initial wet strength.*—This is due to the material being more or less of a plastic solid so that the cement resists tendency to flow until a certain critical load has been applied. Cements heretofore known which have been suggested for such usage are quite liquid in character and will normally flow under their own weight at room temperatures.

(4) *Less tendency to cause "orange-peel" of lacquered tile.*—The most common type of cement heretofore known, suggested for use as a tile cement, is of such a nature as to soak through the back of such tile and contact the polished lacquered surface. With these prior cements in certain cases this is due to a large quantity of certain types of solvents which have been necessarily employed to provide physical characteristics needed during application. The composition hereinabove illustrated contains a relatively small amount of alcohol and the formulation is such that the solvent is liberated slowly, thus greatly minimizing or substantially completely obviating the difficulty, with respect to causing "orange-peel" on lacquered tiles and the like, encountered with prior cement compositions.

(5) *Water-resistance.*—The water-resistance of the composition of Formula I is very good, especially after several days of drying. This property is, of course, very important, as many installations are made in showers where water and steam, in varying amounts, may get back of the tiles and in actual contact with the adhesive. (It will be understood that the water-resistance of the final dried film of the cement is being discussed.)

(6) *Adhesion characteristics.*—The composition of Formula I has good wetting and adhesion to wood, metal, plaster, brick, concrete, etc.

(7) *Color.*—The above composition has an advantageous color, having a color which might be described as straw color or of the general color of peanut butter or somewhat lighter. Various cements heretofore prepared have, in general, been of a darker color, some of which we know being dark gray in color. The advantages of a relatively light colored, clean appearing cement, from the point of view of appearances in decorated rooms in public buildings, especially where light colored or white tile or acoustical elements are employed, will be self-evident.

The minor amount of water employed in the above formula contributes in a very important way to preferred properties of the adhesive. This will be discussed more in detail hereinafter.

Another composition which we have developed which, in certain respects, is even superior to Formula I hereof, is as follows:

*Formula II*

| | Pounds |
|---|---|
| "Solros" wood rosin | 900 |
| "Fosfo" rosin | 300 |
| Dixie clay | 1800 |
| Mineral oil | 250 |
| Alcohol | 120 |
| Oleum spirits | 138 |
| Water | 37 |

The "Solros" rosin, the "Fosfo" rosin, the Dixie clay, the mineral oil, and the alcohol may all be of the same type hereinabove described in connection with Formula I. The Dixie clay is a well-known clay of commerce. The oleum spirits used was a petroleum or gasoline fraction having a distillation range of 305° F. to 425° F.

It will be noted that Formula II has a higher proportion of Dixie clay than does Formula I. This higher proportion of Dixie clay, in the type of formula illustrated, apparently accounts to an important extent for the somewhat higher wet strength of Formula II over Formula I. The higher boiling hydrocarbon solvent employed in Formula II has the virtue of keeping down the rate of evaporation of solvent from the cement after application, as for example when the cement during drying may encounter a temperature of, illustratively, 140° F., more or less. Control of the rate of evaporation is important so that the initial wet strength of the cement immediately after application will not drop off drastically during drying due, for example, to the formation of bubbles behind the tiles or other objects bonded. The two differences just discussed, of Formula II over Formula I, provide quite an appreciable distinction.

The composition of Formula II may, for example, be prepared as follows: The "Solros" and "Fosfo" rosins are charged into a suitable mixer, for example a jacketed internal mixer, e. g., of the Werner-Pfleiderer or Baker-Perkins type. The mixer may be heated by introducing steam under a pressure of 50 lbs./sq. in. gauge into the jacket of the mixer. It is necessary to continue the mixing under temperature conditions of the order illustrated for about 18 minutes, more or less, after which the steam pressure in the jacket is dropped to about 20 lbs./sq. in. gauge. After mixing for about 10 minutes longer, approximately 80% of the total amount of Dixie clay may be added and, after then mixing for about 40 minutes, the steam is turned off and cold water is introduced into the jacket of the mixer. At this point the rosin has been fused or completely melted. The presence of clay during the melting of the rosin serves the function of increasing the volume of the mixture and also serves to stiffen the mixture to a point so as to increase the mechanical working of the rosin which, correspondingly, increases the rate of fusion or melting thereof. Next the mineral oil may be added, slowly at first so as not to break up the mixture or form lumps. As the mix becomes softer, the rate of addition of the mineral oil may be increased. In an ordinary procedure, it may require about 25 minutes to add all of the oil. Next the hydrocarbon solvent (oleum spirits)

may be gradually added and the speed of the mixer increased to give faster mixing. The oleum may be gradually introduced over a period of about 5 minutes. The alcohol is then added gradually, its introduction being effected over a period of about 5 minutes, more or less. The remaining 20 percent of the Dixie clay may now be added and, by reserving this amount of the clay and adding it at this point, it serves the useful function of helping to cool the batch before discharging the same from the mixer. The mixture is quite limpid or fluid at this stage. The water is then added and the mixing continued for about 15 minutes. The addition of the water to the foregoing mixture has the striking effect of thickening up the batch considerably and bringing it to the desired consistency, as opposed to rendering the batch more watery as one might suppose.

A making procedure in general essentially the same as that just described in connection with Formula II may, if desired, be employed in connection with the making of Formula I hereof. The petro-benzol may be added at the same stage as was the oleum in the method just described. All of the clay of Formula I may be added at the point in the above described process where 80 percent of the clay of Formula II was added or, if desired, a relatively small percentage of the clay of Formula I may be held out and added after the addition of hydrocarbon solvent and alcohol.

Another method applicable in the formulation of the composition of Formula II (also applicable in the making of Formula I) which has been employed will be presently described. In general it involves: (1) dissolving the resinous material (e. g., "Solros" and "Fosfo" rosins) in the oil, hydrocarbon solvent, and alcohol; and (2) mixing the clay and water into this resin solution. In making the resin solution, the following is one illustrative procedure employed:

The "Solros" and "Fosfo" resins were melted over a gas fire in a suitable kettle, viz., a varnish maker's kettle.

The mineral oil was added, with stirring, to the melted resin.

The hydrocarbon solvent (oleum) was next stirred in.

The alcohol was then added, after first cooling the mixture to the point where the alcohol would not be lost due to boiling; viz. the mixture was cooled to approximately 160° F.

The resulting solution is thin enough so that it can be poured or pumped quite easily at ordinary temperatures.

Another method of making this resin solution is to charge all the resins, oil, oleum and alcohol into a suitable churn or paddle type mixer and allow them to mix cold to a homogeneous solution. However, experiments have indicated that this method has the disadvantage that it is not easy to get all the resins into the solution in a reasonable length of time by such procedure.

In the second step of this process the clay and water are mixed into the resin solution by employing a suitable heavy duty mixer. An advantageous mixer is one commonly known as a change-can mixer. It is also frequently referred to as a "pony mixer" by such manufacturers thereof as the J. H. Day Company, Cincinnati, Ohio, as well as by various users thereof. In general it comprises a circular or cylindrical shaped can which rotates and a multiple-prong fork-like stirrer that also rotates, and rotates off-center in relation to the cylindrical can. Each prong periodically comes near to the inner circumference of the can during rotation or actuation of the mixer. The resin solution is weighed into the can and the clay is added as fast as it can be taken up by the resin solution. After the clay has been thoroughly mixed in, the water is added and allowed to mix for about 5 minutes, more or less.

Certain tests indicate that Formula II when made according to the process just described, in a number of respects at least, has approximately the same characteristics as the composition of Formula II when made by the first process described hereinabove. However the composition of Formula II, as made and sold in commerce heretofore, has been primarily made according to the process first described herein.

It will be understood that the process last described is also applicable in making the composition of Formula I hereof.

While the above two compositions have been illustrated by specific materials and specific proportions of materials, it will be understood that substitute ingredients and variations in proportions of ingredients are comprehended within the scope of the present invention. However it will be understood that, in making such changes of ingredients or in changing the proportion of the ingredients, due care should be taken so as to avoid rendering the resulting properties of the composition unsatisfactory in this or that respect. For example, while the water may be varied in amount or replaced by a material or fluid of equivalent function, the functions served by the water are highly important. It thickens up the cement and makes a plastic, buttery material out of the cement (which helps to give it wet strength), whereas without water or equivalent the cement is a relatively fluid material, merely a viscous liquid, which is not suitable for such purposes as attaching acoustical tiles, or the like, to the ceilings of rooms, etc. The clay and water appear to have some united action, in the composition illustrated, which accounts for this result, at least in a measure. About 2 percent of water based on the clay, where the clay is of the type of the Dixie clay (i. e., low colloidal kaolin clay) employed, gives about the maximum effect in producing buttery characteristics and increasing wet strength. If less water is used, in relation to the clay, a lower wet strength and greater fluidity will normally result. On the other hand, where substantially more than the amount of water indicated, based on the clay, is used, for example where more than about 4 percent of water, based on the clay, is used, the mass starts to become stringy, or rather heavy and "ropy" and hard to handle. Glycerine and certain chemically similar materials have the property of thickening up the batch somewhat the same as water and may be used alone or in solution with water. However it will be obvious that the use of glycerine increases the expense of the cement, which normally would be a needless sacrifice of economy.

In respect to the buttery characteristics of the cement, in addition to clay, the resinous content of the cement is of importance. In general it has been found desirable, when using "Dixie" clay, to use from about 60 to about 100 parts of the resinous constituents, i. e., the bonding ingredients, to 100 parts of clay. A wide variety of resinous materials or bonding ingredients may be used. Where a combination of "Fosfo" and "Solros" rosins are utilized as in Formulas I and II, and where the total quantity of both types is kept at 1200 parts, the preferred ratios of "Solros" to "Fosfo," i. e., of high acid number to low acid number rosin material varies from about 1:1 to about 4:1, and preferably from about 2:1 to about 4:1.

High acid rosin type resins, e. g., having an acid number of 110-150, such as Solros heat treated rosin or rosin itself, may be used as the sole resinous constituent of our cements, to provide suitable application characteristics and various other characteristics for use, for example, in attaching tiles, acoustical elements, etc., to plaster, wood, concrete, etc.; but such cements, while quite satisfactory if applied soon after manufacture, show a tendency to crystallize or harden in the container on long storage. The tendency towards crystallization is somewhat less apparent with Solros than with other forms of rosins. Low acid rosin type resins or resinates, e. g., having an acid number of 50-90, such as Fosfo rosin or other equivalent limed rosins or other metallic resinates may also be used as the sole resinous constituents of our cements. For example, Fosfo rosin may be substituted for the mixture of Solros and Fosfo rosins in Formula II, in which case the alcohol is replaced by a somewhat increased amount of oleum, for example, a total of 560 lbs. of oleum may be used in the formula, and enough additional water is added to bring the total water content to 60 lbs. in order to achieve proper butteriness of the somewhat more diluted formula.

The use of Fosfo rosin as the sole resinous constituent produces a cement which dries more rapidly and to a somewhat harder final dried film than is the case with Formula II, for example. This is also true of other equivalent metallic resinates, such as zinc resinates, which may be used in place of the Fosfo rosin.

As will hereinafter be pointed out, other solvents, particularly the more active type of hydrocarbons such as the aromatic hydrocarbons, may be desirably substituted for the petrobenzol or oleum. This is particularly true where certain less soluble or less readily soluble materials are included in the composition, for example as in Formula VI. Still other solvents may also be employed for specific purposes; carbon tetrachloride has been used, for example, with Fosfo rosin, Dixie clay, mineral oil, and water, to produce a non-inflammable cement composition of buttery characteristics, but at a considerable increase in cost.

The cements illustrated in the above two formulae (that of Formula II being even better than that of Formula I for most uses) have such a high tensile strength or cohesive strength that, in the wet state, they will support a weight of upwards of 70 lbs./sq. foot to the surface of a ceiling. Also, they will continue to support such a weight during drying. This is a notable strength for a composition of the general nature shown hereinabove, not containing rubber or equivalent rubbery polymer.

Another example of a plastic adhesive cement composition of buttery consistency, similar to that of Formula II except for the use of ordinary rosin in place of heat-treated rosin, as hereinbefore indicated, may consist substantially of the following ingredients in approximately the proportion indicated:

*Formula IIA*

| | Pounds |
|---|---|
| Rosin | 900 |
| Limed rosin | 300 |
| Low colloidal kaolin clay | 1,800 |
| Mineral oil (non-voltatile at room temperatures) | 250 |
| Alcohol | 120 |
| Oleum spirits (solvent) | 138 |
| Water | 37 |

Another composition which differs from those above illustrated, for example in the respect that some rubber is employed, is shown by the following formula:

*Formula III*

| | Pounds |
|---|---|
| Solros rosin | 585 |
| Fosfo rosin | 195 |
| Reclaimed rubber | 195 |
| Dixie clay | 1,300 |
| Mineral oil | 195 |
| Petro-benzol | 400 |
| Water | 26 |

The particular reclaim employed in the above formula is a red inner tube reclaim made by the alkali digester process. Various inner tube reclaims and/or other reclaims, or raw rubber such as latex crepe or smoked sheet, may be employed, usually, however, with some change in the formulation of the adhesive.

The composition of Formula III may be made generally according to the first procedure described hereinabove for compounding the composition of Formula II. However the reclaim (after first working it on a rubber mill to render it more plastic and easier to disperse) is introduced into the heavy duty internal mixer (e. g., Baker-Perkins type) before or at the same time as the Solros and Fosfo rosins are introduced. By way of further slight distinction to the procedure hereinabove described, it is desirable to mix the batch of rubber and resins longer before adding the oil and solvents, in order to get the rubber thoroughly dispersed and to render the batch uniform, which will be evident to the operator.

Although the composition of Formula III may be employed as a tile cement or for like purposes, the composition of Formula II (or of Formula I) is usually more preferable as a tile cement. However such cements as illustrated in Formula III have a definite advantage where a tile cement is desired with increased shock-resistance in the form of the dried film and one which has less change in body or stiffness with changes in temperature. Additionally, the above composition may be employed to advantage for certain other uses such as, for example, to adhere so-called structural glass (e. g., "Carrara") to another surface such as that of wall board.

Another rubber-containing cement, which we have prepared, which also has utility, for example, as an acoustical cement, is the following in which all parts are by weight:

*Formula IV*

| | Parts |
|---|---|
| Solros wood rosin | 1,050 |
| Fosfo rosin | 150 |
| Heated tube scrap | 300 |
| Mineral oil—Saybolt viscosity at 100° F. of 500 to 530 seconds | 300 |
| Dixie clay | 2,000 |
| Ethyl alcohol | 60 |
| Oleum spirits—305° to 425° F. boiling range | 420 |
| Water | 38 |

The above composition, in addition to increased shock resistance, has several other advantages over such compositions as those of Formulae I and II, including better heat-resistance, better handling properties at low temperatures (e. g., 35° F.) and faster increase of strength of the cement bond after application.

In a modified formulation of the above composition we employed somewhat less Dixie clay (about 1900 parts) and also somewhat less ethyl alcohol (about 30 parts). Of course, substantially wider variations than this in these and other ingredients are contemplated, as will be generally understood from the discussion hereinabove, and from this application as a whole.

The heated tube scrap was prepared by heating scrap red inner tubes in an autoclave in contact with steam at 160 lbs. per square inch gauge pressure for a period of 16 hours. At the end of this time the tubes were very materially softened so that they could be dispersed in the resin-clay mixture. The resulting heated tube scrap was then worked on an ordinary rubber mill and a part of the Dixie clay of Formula IV and also a part of the Fosfo rosin was incorporated with the rubber during milling. Half as much Dixie clay as tube scrap was first added and milled with the heated tube scrap for about 20 minutes, in order to stiffen it to facilitate refining out small lumps which had not been softened sufficiently during the heating process. Enough Fosfo rosin (about 15% by weight of that of the heated tube scrap) was then added to the rubber on the mill to soften up the rubber scrap and clay mixture so that it could be readily dispersed in the internal mixer, i. e. the Baker-Perkins mixer or equivalent. This milled composition was then introduced into the internal mixer. The milled batch may contain ingredients, for example, in the following proportion:

| | Parts |
|---|---|
| Heated tube scrap | 100 |
| Dixie clay | 50 |
| Fosfo rosin | 15 |

The remainder of the procedure for formulating the composition of Formula IV may, for example, be similar, in general respects, to that first described hereinabove in connection with Formula II. It will be understood that, in adding ingredients to the batch in the internal mixer, the amounts of clay and Fosfo rosin added with the tube scrap in the milled batch are subtracted from the amount shown in Formula IV, so that the total amounts in the resulting cement composition will be as illustrated in Formula IV. Here again, as described in connection with Formula III, it is necessary to mix the rubber composition longer before the addition of the oil and solvent in order to get a smooth dispersion of the rubber and to avoid the formation of rubber lumps.

It is to be noted that the results produced by use of the heated tube scrap, as just illustrated above, cannot be attained or duplicated by the use of ordinary commercial types of reclaim rubber. That is, the finished cement made with the heated tube scrap has advantages over an otherwise comparable cement in which a conventional reclaim is employed instead of the heated tube scrap of the present invention.

It will be understood that the second method hereinabove described in detail for compounding the components of Formulae I and II, which among other things contemplated employing a change-can or pony mixer, was especially intended for use in connection with such compositions as Formulae I and II, as distinguished from Formulae III and IV.

As a further modification of the present invention, the composition as illustrated in Formula I may be modified by stirring in a 60 percent latex. The properties of the resulting composition are changed very noticeably, the composition becoming quite tough, with pronounced rubbery properties and also with increasing strength of bond when dried. As little as 50 parts of solid rubber, as latex, to 1200 parts of resin is enough to have a very significant effect on the properties of the resulting composition. Apparently the latex dispersion breaks when the same is added to the resinous composition in the internal mixer, giving an interlacing network of rubber which toughens the cement. However such a composition is less desired by most users, for example as a tile cement or for analogous purposes than Formulae I and II for the reason that the same has a tendency to be somewhat stringy.

The following formula illustrates a variation of Formula I hereinabove described.

*Formula V*

| | Pounds |
|---|---|
| Solros rosin | 375 |
| Fosfo rosin | 125 |
| "Korite" asphalt | 700 |
| Dixie clay | 1,500 |
| Alcohol | 90 |
| Petrobenzol | 350 |
| Water | 37 |

It will be noted that the amount of resins have been reduced as compared with Formula I and a substantial amount of asphalt has been used. The particular asphalt illustrated is a dark colored blown residual petroleum asphalt having a melting point or softening point of approximately 200° F., ball and ring method.

The composition of Formula V is more economical than that of Formula I and it resembles Formula I quite closely in certain properties but, significantly, not in color. The relatively lighter color of Formula I, i. e. its straw color or light peanut butter color, is considered imperative by many users of tile cements, whereas the composition of Formula V is relatively dark in color. The composition of Formula V, however, dries somewhat faster than that of either of Formulae I or II and has very good ageing properties. It remains more plastic than Formula I when heated at temperatures around 140° F. to 160° F.

The color of the composition of Formula V may be made somewhat lighter by, for example, in lieu of the asphalt specified, employing materials that are some times referred to as "petroleum resins" and some times as "Albino asphalts." These materials are at the present time quite expensive as compared with the ordinary asphalts, or even with wood rosin. However, for certain usages, the asphalts and petroleum resins have an advantage over regular wood rosins in that they do not contain any significant amount of free acids, which makes them resistant to alkali materials. As plasters and concretes often contain some alkali that has a tendency to attack wood rosin adhesives under certain conditions, the use of a relatively inert resin such as the Albino asphalts have certain advantages.

However, except where the conditions are relatively acute, no practical difficulty whatever has been experienced in employing such compositions as those of Formulae I, II, etc., hereinabove illustrated, to attach acoustical tiles or other tiles or members to plaster, concrete, or other surfaces.

It will be apparent that abietate type resins such as the combinations of "Solros" and "Fosfo" resins specified in Formulas I–IV and, in conjunction with asphalt, in Formula V, provide distinct advantages where low cost is an important consideration. It is to be noted that many other resins or combinations thereof may be used to provide cement compositions of considerable utility for the same or special purposes, as indicated by the following additional specific formulas.

Formula VI

| | Pounds |
|---|---|
| Rubbery chloroprene polymer | 300 |
| Morpholine | 15 |
| Oil-soluble heat-advancing phenolaldehyde resin | 180 |
| Hard coumarone-indene resin | 100 |
| Magnesia | 120 |
| Zinc oxide | 150 |
| High aromatic content hydrocarbon solvent | 580 |
| Asbestine | 720 |
| Dixie clay | 650 |
| Water | 22 |

The rubbery chloroprene polymer, e. g., Neoprene, is softened by milling and by incorporation of the morpholine and is then mixed cold in the heavy duty internal mixer with the resins and pigments. The solvent is finally added and worked in well, producing a fluid mixture. Addition of the water then brings about the desired conversion of this fluid composition to a buttery, plastic solid state well adapted for use as a tile cement. After application, and in the dried form, this cement has superior bonding power and is highly resistant to shock while still being hard and nondeformable.

As one example of a suitable oil-soluble heat-advancing phenol-aldehyde resin for use in the above formula may be listed an alkali catalyzed pure phenolic resin produced from mixed alkyl-substituted phenols and formaldehyde. In this formula, the use of a solvent high in aromatic content is found desirable due to the presence of the chloroprene polymer; a suitable solvent may have a distillation range of approximately 200–265° F. and an approximate aromatic blending value of 50 percent.

In another formula, a small amount of Fosfo rosin is used together with a larger amount of a chlorinated paraffin, as follows:

Formula VII

| | Parts |
|---|---|
| Highly chlorinated paraffin | 120 |
| Carcass stock reclaim rubber | 50 |
| Fosfo rosin | 50 |
| Dixie clay | 200 |
| Water | 4.5 |
| Petro-benzol | 80 |

A hard, highly chlorinated paraffin wax, containing about 69–72% chlorine, may be used in the above formula, which is compounded by first milling the reclaim rubber, and adding thereto the other ingredients in the heavy duty internal mixer, as previously described. The final addition of the water produces an intense stiffening action and results in the buttery characteristic required for satisfactory application of the material as a tile cement. This Formula VII, by virtue of the presence of the large quantity of chlorinated wax, is highly fire-resistant and has important fields of utility due to this additional property.

Formula VIII

| | Parts |
|---|---|
| Phenol-aldehyde resin as in Formula VI | 200 |
| Dixie clay | 300 |
| Heavy mineral oil | 41 |
| Oleum spirits | 100 |
| Water | 10 |

A heavy mineral oil, such as illustrated in Formula IV above, is a suitable oil for use in Formula VIII, just given. Additionally, cements such as Formula VIII are resistant to high temperatures, since the phenolic resin used in this formula sets up to an increased melting point on subjection to heating.

Still other cements have been made in which as the sole resinous constituent there was employed ester gum (commercial glycerol abietate), a high melting pure hydrocarbon thermoplastic terpene resin of low acid number, dehydroabietic acid having a melting point of about 65° C. and a high resistance to oxidation, and even soft resins such as methyl abietate and hydrogenated methyl abietate. Natural gums, such as Manila gum, have also been used, for example to replace part of the resins of Formula I or II; but Manila gum is relatively high in cost and tends to reduce the plasticity or yieldability of the final dried film.

In all cases, the cement prior to the addition of water was soft or liquid, and if applied to a ceiling or wall surface would flow readily under its own weight or the weight of an attached tile or the like. After incorporation of water, as shown in the various formulas, the cement was firm and buttery; it could be readily spread in place, but remained as a plastic solid which, under the weight of even quite heavy tile sections, did not flow or change position, and therefore, both during drying and later, held the tile firmly in position.

The amount of Dixie clay or equivalent which is employed in these various formulas is fairly critical in producing a good tile cement. The various formulae hereinabove presented illustrate different amounts of clay. They do not illustrate the limits of variation, but do illustrate preferred proportions. If too much clay is employed, the "wetting in" or "transferability" of the cement to tile, plaster, etc., is impaired. On the other hand, if too little clay is employed, it is not possible to render the cement sufficiently buttery or stiff when water is added, with the result that the wet strength of the cement and its application characteristics are impaired.

Other clays or other materials may be used in place of some or all of the Dixie clay, if desired. However, a finely divided, low colloidal kaolin clay has, in general, proved most satisfactory thus far. Certain clays tend to form a jelly-like structure, which is not desired, while Dixie clay provides a cement having more "slip," which is highly desirable in cements to be used as tile cements and the like. China clay, "Par clay," and Georgia clay are all examples of other suitable low colloidal kaolin clays.

Clays mentioned hereinabove are illustrative of clayey inorganic materials broadly, which generally have $SiO_2$ and $Al_2O_3$ in combination, whether naturally occurring products or manufactured products, which may be employed, in the combination herein illustrated and defined, in making our tile cements.

If a minor proportion of a somewhat higher colloidal clay is used along with a low colloidal clay such as Dixie clay, then a somewhat higher ratio of water to clay than shown, for example, in Formula II may be used to give best results. On the other hand, if a low colloidal clay somewhat coarser than Dixie clay is used, ordinarily a somewhat lower ratio of water to clay than illustrated in Formulae I and II will give optimum results.

It will be noted that Dixie clay and the like, although water-insoluble, are nevertheless hydrophylic agents of finely divided or triturated nature. The preferred equivalents of Dixie clay are substantially water-insoluble but hydrophilic materials which are non-fibrous or substantially so, materials capable of absorbing water and forming a uniform or pasty mixture therewith being especially contemplated. However, the present invention does not preclude the addition of fibrous materials but the same are not the equivalents of Dixie clay and the like. The stiffening of the cement upon the addition of water as hereinabove described indicates some pronounced physical or physico-chemical interaction between the clay and other ingredients of the cement.

Other pigments or fillers may be used in addition to the various clays for certain specific purposes, as desired. Thus the asbestine added in Formula VI increases the hardness of the dried cement coating.

In order to avoid cracking and fracturing of the dried resinous cement of our invention, the normally brittle resinous constituents are rendered non-brittle by the addition of a suitable toughening agent or plasticizer for the dried composition. Mineral oil serves this function in Formulas I, II and VIII, and also, in conjunction with rubber, in Formulas III and IV.

Many other plasticizers including drying, semi-drying, and non-drying vegetable oils or the like have also been tried, comprising castor oil, palm oil, cocoanut oil, linseed oil and soybean oil, and may be employed in lieu of the hydrocarbon or mineral oil illustrated. These materials are considered as good as, and possibly somewhat better than mineral oils in respect to plasticizing, i. e., rendering less brittle, the rosins or like resins; however their comparatively high cost makes their use undesirable. Pine tar, pine tar oil, japan wax, paraffin wax, etc., have also been tried in place of mineral oil but, although they do act to decrease the brittleness of rosins or like resins, they are technologically inferior to mineral oil. In addition, mineral or hydrocarbon oils have the virtue, particularly as compared to the drying oils, of remaining in more or less unchanged state over a long period of time in the final dried film or coat of cement.

In Formula V, asphalt in relatively large amount acts as a plasticizer or brittleness-reducer for the brittle rosin or resinous constituents and also is a preponderant proportion of the resinous phase of the cement. The processed rubber of Formulas III and IV, the synthetic rubber (polychloroprene) of Formula VI, and the combination of reclaim rubber and chlorinated paraffin of Formula VII, all provide or add to the toughness, i. e., the reduction in brittleness, of the dried cement composition which is necessary for its best success in maintaining acoustic tiles and the like in position on walls and ceilings.

The alcohol employed in certain of the listed formulas serves the advantageous function of aiding in keeping the resins in solution and lending stability to the cements, as well as serving to improve the "wetting in" characteristics of the latter. It also improves the water resistance of a wet film of the cement very noticeably, the cement even becoming somewhat firmer under water, due possibly to removal of the alcohol by diffusion in the water. In lieu of ethyl alcohol, methyl alcohol, propyl alcohol and various other volatile alcohols may be employed. Additionally other materials such as ethylene glycol monoethyl ether, ethylene glycol monobutyl ether, diethylene glycol monoethyl ether, etc., have been found to act like alcohol to a considerable extent but tend to make the cement set up more slowly, which is ordinarily a disadvantage. Additionally it is likely that methyl acetate, ethyl acetate, etc., would serve, at least to some extent, to provide one or more of the functions of ethyl alcohol. However, in general, where alcohol or similar solvent modifier is found to be desirable for one reason or another, we prefer to use ethyl alcohol because of its ready availability and also because of its advantageous properties. In compositions such as those of Formula I, it appears that there may be some short of a quasi-chemical or physico-chemical interaction between the ethyl alcohol or equivalent and the Fosfo rosin or equivalent. Also, the consistency or stiffness of the cement for a given solids content is influenced to some extent by the ethyl alcohol.

Alcohol or the like is not, however, to be considered an essential ingredient of our novel cements, particularly where various resins other than the rosin type resins are used. Thus in Formulas III, VII and VIII a gasoline-type solvent by itself is found to be effective; Formula VI, with a difficultly soluble ingredient, requires a hydrocarbon solvent of somewhat improved solvency characteristics.

It will be apparent that various organic solvents may be employed in place of some or all of the particular solvents illustrated in the above formulae. Where substitute solvents are employed, they should be chosen with reference to their volatility, drying properties and other characteristics so as, for example, not to adversely affect the drying characteristics of the resulting cement. By way of illustration, where a solvent which is too volatile is employed and the same is used to attach tiles, for example, to an underlying surface, such as a ceiling, the solvent in evaporating relatively rapidly tends to form bubbles and to force the bonded surfaces apart during the course of the drying period. In order to have a large factor of safety, it is important that the cement have a high cohesive or tensile strength during the setting operation and in accomplishing this it is in turn important that the bond between tiles and the like and a ceiling or wall be not broken at various points due to too rapid evaporation of solvents. For example, benzol or like coal tar solvents are satisfactory substitutes for oleum spirits etc. in terms of solvent action, but their higher cost and relative toxicity make the same much less desirable than petroleum fractions of suitable volatility in those cases where the latter type are of sufficiently active solvency for the particular composition in question.

While the present invention has been illustrated in various details, it will be understood that it is not to be limited thereby and that we contemplate all embodiments within the scope of the present application, taken in the light of the prior art.

What we claim is:

1. A plastic adhesive composition adapted to secure acoustical tiles to walls and ceilings, and of yieldable, plastic, non-brittle character in the form of the dried film comprising: a yieldable, plastic, non-brittle resinous bonding base material comprising a brittle soluble resinous material and a compatible organic toughening agent therefor; a volatile hydrocarbon solvent; a finely divided clay, in an amount by weight at least approximately as great as said resinous base material but not substantially exceeding one-half that of the entire said adhesive composition; and water, in an amount by weight of the order of 2 to 4 percent of that of said clay; said resinous base material making up roughly one-third of the entire said adhesive composition; and said volatile solvent being present in substantial but lesser amount than said resinous base material; said adhesive composition being of buttery, plastic consistency and of wet strength suitable to hold tiles to walls and ceilings during setting.

2. A plastic adhesive composition adapted to secure acoustical tiles to walls and ceilings, and of yieldable, plastic, non-brittle character in the form of the dried film, comprising: a yieldable, plastic, non-brittle resinous bonding base material comprising a brittle soluble resinous material and a compatible oil plasticizer therefor; a volatile hydrocarbon solvent; a finely divided hydrophilic clayey inorganic material having $SiO_2$ and $Al_2O_3$ in combination, in an amount by weight at least approximately as great as said resinous base material but not substantially exceeding one-half that of the entire said adhesive composition; and water, in an amount by weight of the order of 2 to 4 percent of that of said clayey material; said resinous base material making up roughly one-third of the entire said adhesive composition; and said volatile solvent being present in substantial but lesser amount than said resinous base material; said adhesive composition being of buttery, plastic consistency and of wet strength suitable to hold tiles to walls and ceilings during setting.

3. A plastic adhesive composition adapted to secure acoustical tiles to walls and ceilings, and of yieldable, plastic, non-brittle character in the form of the dried film, comprising: a tough, yieldable, non-brittle resinous base bonding material, dissolved in a volatile hydrocarbon solvent therefor; a finely divided hydrophilic clayey inorganic material having $SiO_2$ and $Al_2O_3$ in combination, in an amount by weight at least approximately as great as said resinous base material but not substantially exceeding one-half that of the entire said adhesive composition; and water, in an amount by weight of the order of 2 to 4 percent of that of said clayey material, to convert the otherwise soft and flowable composition to a buttery and plastic consistency; said resinous base material making up roughly one-third of the entire said adhesive composition; and said volatile solvent being present in substantial but lesser amount than said resinous base material; said adhesive composition being of buttery, plastic consistency and of wet strength suitable to hold tiles to walls and ceilings during setting.

4. A plastic adhesive composition adapted to secure acoustical tiles to walls and ceilings, and of yieldable, plastic, non-brittle character in the form of the dried film, comprising: a yieldable, plastic, non-brittle resinous bonding base material comprising a resin containing the abietate radical and an oil plasticizer for said resin; a volatile hydrocarbon solvent; a finely divided clay, in an amount by weight at least approximately as great as said resinous base material but not substantially exceeding one-half that of the entire said adhesive composition; and water, in an amount by weight of the order of 2 to 4 percent of that of said clay; said resinous base material making up roughly one-third of the entire said adhesive composition; and said volatile solvent being present in substantial but lesser amount than said resinous base material; said adhesive composition being of buttery, plastic consistency and of wet strength suitable to hold tiles to walls and ceilings during setting.

5. The new and improved construction comprising tiles joined to a solid wall surface by the non-tacky but firmly adherent dried residue of a plastic adhesive composition as defined in claim 4.

6. The new and improved construction comprising tiles joined to a solid wall surface by the non-tacky but firmly adherent dried residue of a plastic adhesive composition as defined in claim 3.

GORDON F. LINDNER.
HARVEY J. LIVERMORE.

REFERENCES CITED

The following references are of record in the file of this patent:

UNITED STATES PATENTS

| Number | Name | Date |
|---|---|---|
| 2,114,473 | Labia | Apr. 17, 1938 |
| 1,856,369 | Baldwin | May 3, 1932 |
| 2,064,139 | Allen | Dec. 15, 1936 |
| 2,313,114 | Adams | Mar. 9, 1943 |

FOREIGN PATENTS

| Number | Country | Date |
|---|---|---|
| 550,515 | Great Britain | Jan. 12, 1943 |
| 539,077 | Great Britain | Aug. 27, 1941 |

OTHER REFERENCES

Bennett's Chemical Formulary, 4th vol., page 25 (top of column 2), 1939.